UNITED STATES PATENT OFFICE.

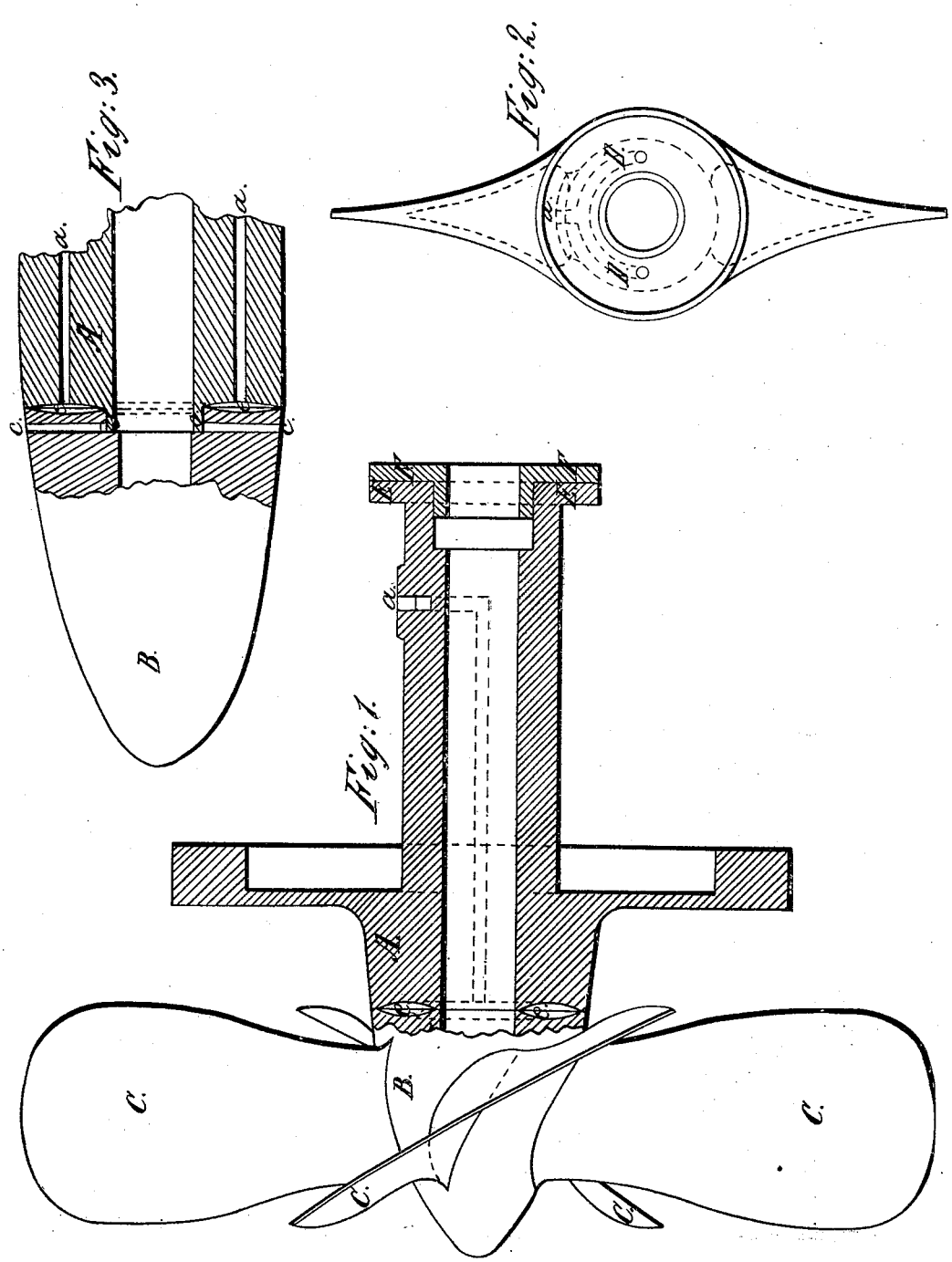

THURE EMANUEL SANDGREN, OF WILMINGTON, DELAWARE.

HYDRODYNAMIC FRICTION-JOINT.

Specification forming part of Letters Patent No. 13,324, dated July 24, 1855.

*To all whom it may concern:*

Be it known that I, THURE EMANUEL SANDGREN, of Wilmington, in the county of New Castle and State of Delaware, have invented certain new and useful Improvements in a Hydraulic Anti-Friction Joint for Propellers or other Shafting; and I do hereby declare the following to be a full, clear, and exact description of the same, reference being had to the accompanying drawings, making a part thereof, in which—

Figure 1 represents a side view of the blades and hub of a propeller, with the case which forms the hydraulic bearing in section, the shaft being removed. Fig. 2 represents an end view of the case or hollow cylinder from that end of it next the hub of the propeller and showing the water-inlets to the joint.

Similar letters where they occur in both the figures refer to like parts.

The nature of my invention relates to a manner of constructing a water-bearing for a revolving shaft for the purpose of counteracting friction and for keeping the rubbing parts from becoming heated.

To enable others skilled in the art to make and use the same, I will proceed to describe my invention in connection with the drawings.

In the drawings I have represented the invention as applied to a propeller-shaft, and in which A represents a hollow metallic cylinder in the bore of which the propeller-shaft snugly fits and turns. B is the hub of the propeller, and C the blades thereof, said hub being united to the shaft in any of the well-known ways. In that end of the cylinder most remote from the hub of the propeller is made an opening $a$, which extends about half-way through the shell of said cylinder, whence it branches off into two lateral ducts, as seen in dotted lines, Fig. 2, and extends back to the step, and issues into a circular groove $e$ in the rear of said cylinder. On the shoulder of the hub is formed a similar groove with that on the cylinder, and the two grooves when the hub and cylinder are united form a water-space between them, as seen at $e$ in the sectional portion of Fig. 1. Water is forced by a hydraulic pump or otherwise through the opening $a$, and thence through the side ducts or passages, of which there may be any number, into the space $e$, which may be termed the "step" or "bearing-joint" of the propeller. The water will pass from the space $e$ back through the cylinder between the shaft and the inner perimeter of the cylinder, and serve as a lubricator to their rubbing-surfaces and keep the shaft from becoming heated. A flange E is turned on the front end of the cylinder A, and by means of a packing-ring F and any suitable packing material a tight joint is made at that end between the propeller-shaft and the cylinder to prevent the water from leaking into the vessel or out of the cylinder. The only escape for the water is through the joint where the hub of the propeller meets the cylinder. By this means water is interposed between the rubbing-surfaces and takes the place of oil to prevent friction and wearing of the parts. It also prevents the heating of the shaft and allows it to be run with great rapidity without the least danger.

The cylinder is of course a fixture and forms the stern port for the shaft of the propeller. The same principle herein described may be applied to other shafting than that of a propeller, it only requiring such modifications as the circumstances of case or the particular application may require.

Fig. 3 represents a modification of my general plan, in which a flange $o$ is formed on the cylinder, which allows the waste water from $e$ to pass out through the small openings $c$ in the hub. This prevents the water from returning into the stern bearing.

Having thus fully described the nature of my invention, what I claim therein as new, and desire to secure by Letters Patent, is—

The forming of a hydraulic bearing for a rotating shaft by means of the water-ducts passing through the cylinder or case in which the shaft rotates, for the purpose of supplying water as a lubricator to the rubbing-surfaces, in the manner and for the purpose set forth.

THURE EMANUEL SANDGREN.

Witnesses:
JOHN W. NYSTROM,
AUG. ENGSTROM.